United States Patent [19]

Fugleberg

[11] Patent Number: 5,585,079
[45] Date of Patent: Dec. 17, 1996

[54] METHOD FOR LEACHING MATERIAL CONTAINING ZINC OXIDE AND ZINC SILICATE

[75] Inventor: Sigmund P. Fugleberg, Turku, Finland

[73] Assignee: Outokumpu Engineering Contracters Oy, Espoo, Finland

[21] Appl. No.: 447,834

[22] Filed: May 23, 1995

Related U.S. Application Data

[63] Continuation-in-part of Ser. No. 258,535, Jun. 10, 1994, abandoned.

[30] Foreign Application Priority Data

Jun. 24, 1993 [FI] Finland ................. 932886

[51] Int. Cl.$^6$ ................. C01G 9/00; C22B 19/00
[52] U.S. Cl. ................. 423/109; 423/622
[58] Field of Search ................. 423/109, 622

[56] References Cited

U.S. PATENT DOCUMENTS

| | | | |
|---|---|---|---|
| 3,649,186 | 3/1972 | Colombo et al. | 423/108 |
| 3,656,941 | 4/1972 | Mathew et al. | 423/109 |
| 3,954,937 | 5/1976 | Bodson | 423/109 |
| 3,959,437 | 5/1976 | Rastas et al. | 423/109 |
| 4,148,862 | 4/1979 | Fugleberg et al. | 423/109 |
| 4,292,283 | 9/1981 | Weigel et al. | 423/109 |
| 4,440,569 | 4/1984 | Weir et al. | 423/109 |
| 4,510,028 | 4/1985 | Bolton et al. | 423/109 |
| 4,778,520 | 10/1988 | Spink et al. | 423/109 |

*Primary Examiner*—Steven Bos
*Attorney, Agent, or Firm*—Brooks Haidt Haffner & Delahunty

[57] ABSTRACT

The invention relates to a method for recovering zinc from a zinc oxide bearing material containing silicates. According to the method, the leaching of zinc compounds is carried out in circumstances where the silicates remain undissolved and consequently do not cause filtering problems. The silicate bearing residue is treated in a Waelz process, so that the major part of the silicic acid contained in the silicates is combined in the iron silicate slag formed in the Waelz process, and the zinc is returned into leaching mainly in oxidic form.

3 Claims, 3 Drawing Sheets

METHOD FOR LEACHING MATERIAL CONTAINING ZINC OXIDE AND ZINC SILICATE

This application is a continuation-in-part of application Ser. No. 08/258,535, filed Jun. 10, 1994, now abandoned.

BACKGROUND OF THE INVENTION

1. Field of the Invention

The present invention relates to a method for recovering zinc from zinc oxide bearing material containing silicates. According to the method, the leaching of zinc compounds is carried out in circumstances where the silicates remain undissolved and therefore do not cause filtering problems. The silicate bearing residue is treated in a Waelz process, so that the major part of the silicic acid of the silicates is combined to the iron silicate slag formed in the Waelz process, and the zinc is returned to leaching, mainly in oxidic form.

2. Description of the Preferred Art

Zinc sulfide concentrate forms the major part of the raw materials in the electrolytic zinc process. The concentrate is roasted, and the formed calcine is leached. In addition to zinc, the concentrate contains remarkable amounts of iron, as well as quartz, among others. During roasting, iron produces zinc ferrite $ZnO.Fe_2O_3$, and quartz produces zinc silicates $Zn_2SiO_4$; these are important bearers of zinc, apart from the principal component, zinc oxide.

Generally the zinc oxide of the zinc calcine is first leached with weak sulfuric acid (electrolysis return acid), in neutral leaching comprising either one or two stages. After solution purification, the formed zinc sulfate solution is conducted to electrolysis. The undissolved ferrites require their own special treatment, which is generally carried out hydrowise, so that they are conducted either to strong acid leaching or to a conversion stage described for instance in the Norwegian patent 108,047 and in the U.S. Pat. No. 3,959,437. In the strong acid leaching and the conversion stage, the pH remains so low (<2), that in addition to ferrites, also the zinc silicate is dissolved. The major part of the dissolved iron is precipitated as jarosite or goethite, and the silicic acid of zinc silicate is precipitated as $SiO_2$. The formed iron—silicon acid slag is washed and transported to a disposal site, and the solution, containing the zinc, is returned to neutral leaching. The returned solution also contains a certain amount of ferric iron, which is essentially important in the removal of certain hazardous materials, such as antimony, arsenic and germanium, in the neutral leaching stage.

In order to recover the zinc, the finely divided ferritic leaching residue obtained from the neutral leaching of the calcine may also be conducted to a Waelz process, where the precipitate is treated by means of coal at a high temperature in such a reducing fashion, that the remaining zinc is evaporated, and at the same time the iron is combined to the iron silicate slag. The evaporated zinc is oxidized into zinc oxide, which is fed back to neutral leaching. The formed zinc oxide is not absolutely pure, but contains a small amount of silicate, too. When this is transferred back to circulation, dissolving of the silicate again causes problems. The settling and filtering of a silicate gel formed in acid leaching requires several stages, and a large amount of washing water is needed. When the washing of the precipitate remains insufficient, into the Waelz furnace there is fed zinc sulfate containing precipitate, the drying whereof requires energy, and reduction on the other hand requires a lot of coal. The sulfur formed in decomposing of the sulfate goes to the gases as sulfur dioxide, and is thus hazardous for the environment.

SUMMARY OF THE INVENTION

According to the new method of the present invention, the leaching of zinc oxide is carried out in such circumstances that the silicates remain undissolved, and consequently do not form a gel that is difficult to settle. The waste containing zinc ferrite and silicate is treated in the Waelz process, wherein iron and silicate form inert iron silicate slag, i.e., slag that does not participate in or inferfere with the other reactions in the process. The zinc contained in the waste is evaporated and recovered as oxide, and then fed back to the leaching stage. The essential novel features are apparent from the appended patent claims.

The well-known Waelz process is a metallurgical process in which zinc ore or concentrate is heated with fuel oil, coke or powdered coal in a reducing fashion in a rotary kiln; volatized zinc and zinc oxide result. The Waelz process has been described in Transactions of the American Institute of Mining and Metallurgical Engineers, Vol. 121 Metallurgy of Lead and Zinc, 1936, pages 702–720, "The Waelz Process", William E. Harris. A process using a rotary (Waelz) furnace for preheating and calcining zinciferous ores and subsequently using a fluidized bed furnace for treating the calcined ores with reducing gases has been described in U.S. Pat. No. 3,649,186 granted Mar. 14, 1972 to Colombo et al.

The process of the present invention treats concentrates containing significant amounts of zinc silicate and zinc ferrite. By maintaining the pH at a level of 3.0 or more, silicates do not dissolve and the formation of silicic acid gel is prevented. The results in an easily settled and filtered precipitate which is then conducted to a Waelz furnace, where the zinc ferrites and silicates are reduced by means of coal and the zinc is evaporated. The zinc vapor is then oxidized and the oxide so formed can be recycled to a neutral leaching stage of the process.

The Waelz furnace derives its name from the German word "Waelzen" which can be translated as a "trundling motion", descriptive of the movement of a solid charge through a long, slowly rotating kiln. Although a wide variety of materials can be treated in a Waelz furnace, and the furnace structure can be adapted accordingly, the Waelz furnace preferably used for performing the treatment according to the present invention uses powdered coal fed into the furnace with the zinc concentrate. The kiln itself can consist of a long, horizontally inclined cylinder which can be supported on bearings for rotation, driven by any suitable drive mechanism. An outlet for the gases is provided, as is an exit for solids from the kiln.

The following detailed description of the preferred embodiment of the process of the invention will enable those acquainted with the techniques of processing ores and concentrates to use a Waelz furnace suited to the quantities and rate of feed of the zinc concentrates to be processed.

BRIEF DESCRIPTION OF THE DRAWINGS

The invention is further illustrated with reference to the appended flowsheets, where.

DESCRIPTION OF THE PREFERRED EMBODIMENTS

Figure 1:
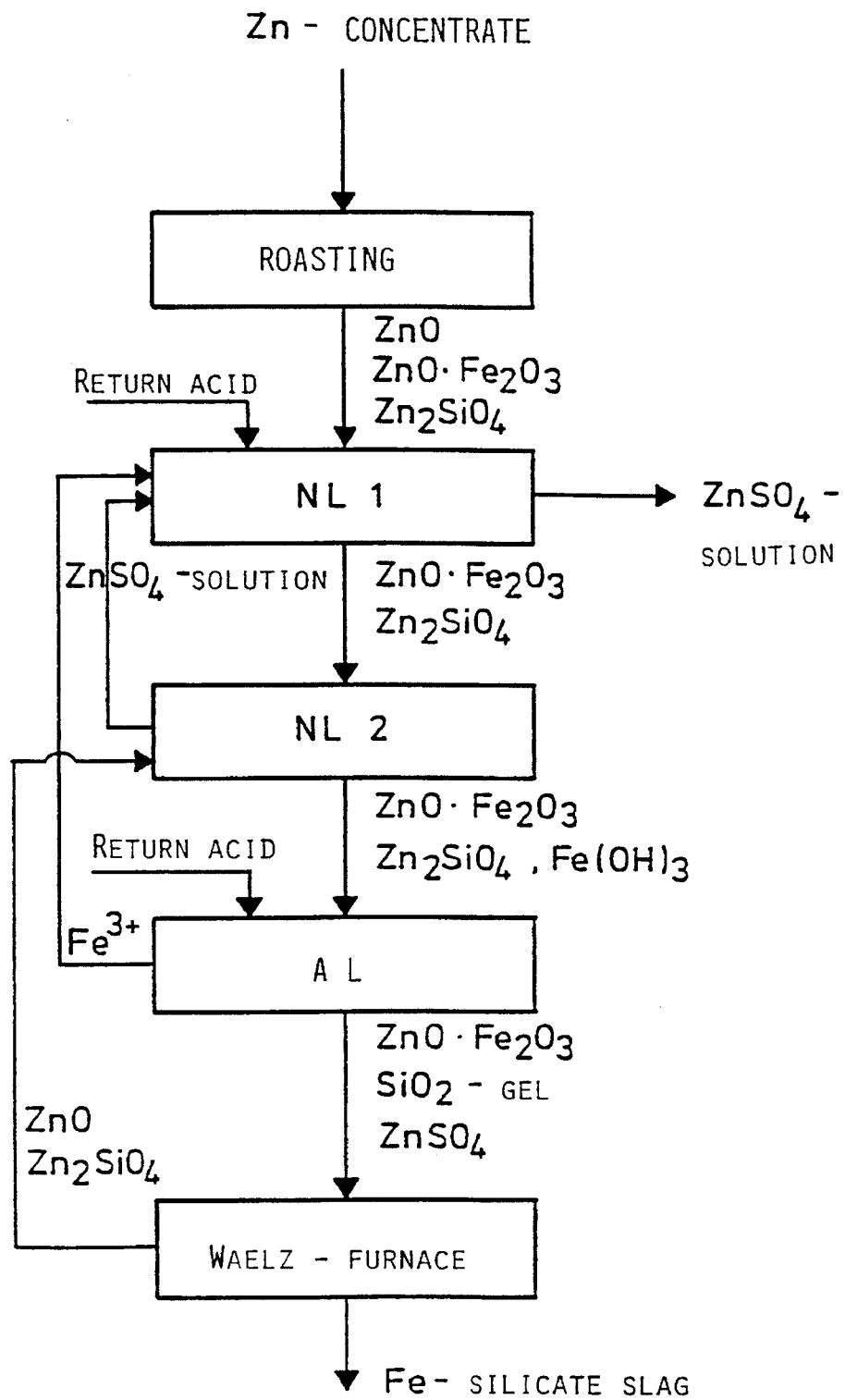
FIG. 1 illustrates a state-of-the-art process.

FIG. 1 is a flowsheet of a state-of-the-art process for treating zinc sulfide concentrate. The zinc concentrate, which is mainly zinc sulfide and partly iron and quartz, is roasted, and as a result, there is obtained a calcine which is mainly zinc oxide but also contains small amounts of zinc ferrite and zinc silicate. The calcine is leached in two neutral leaching stages NL1 and NL2 by means of return acid. The formed zinc sulfate solution is conducted further to solution purification and electrolysis. The undissolved precipitate, containing mainly the zinc ferrite, zinc silicate and somewhat ferrihydroxide $Fe(OH)_3$, is conducted to an acid leaching stage AL. Here the acid level (pH<2) is kept such that $Fe(OH)_3$ is dissolved, so that the $Fe^{3+}$ ion amount required in the neutral leaching stage is obtained in the solution. However, in these circumstances silicates are dissolved too, and the formed precipitate and solution are difficult to separate from each other, which leads to the above described problems. The formed precipitate is treated in a Waelz furnace, and the evaporated zinc, which is oxidized into zinc oxide and also contains zinc silicate, is fed back to neutral leaching. The circulating silicate causes continuous problems in the process.

Figure 2:
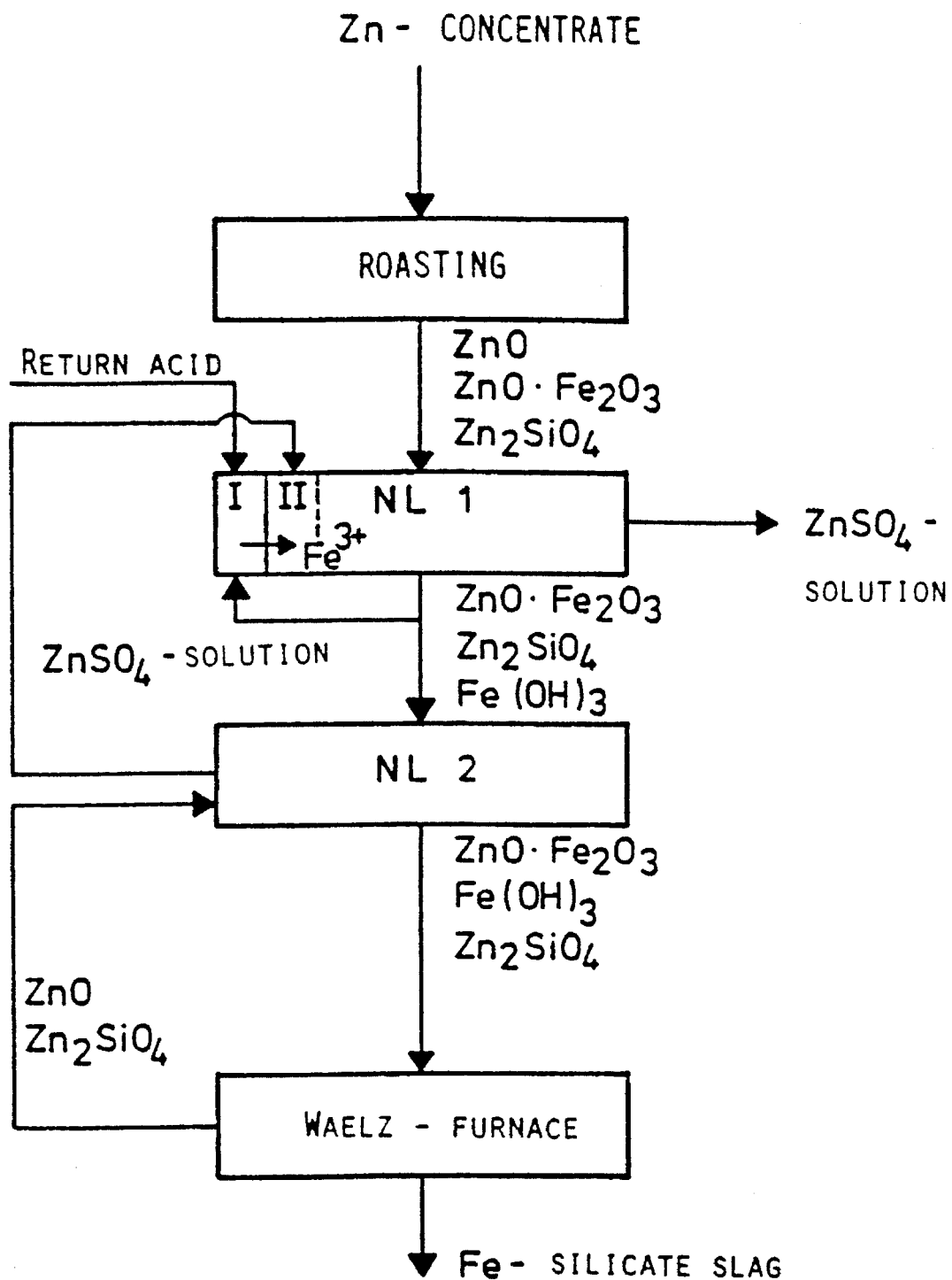
FIG. 2 is a flowsheet of the process of the present invention.

According to the flowsheet of FIG. 2, the process is of the same type as the above described state-of-the-art method, but the formation of silicic acid gel is prevented by leaving the acid leaching out of the process. The trivalent iron needed for the precipitation of impurities in neutral leaching is formed already in the first stage NL1 of neutral leaching, so that the whole amount of return acid is fed into the first reactor I of the first stage, and to this same reactor there is returned part of the ferrite residue, which dissolves quickly in these conditions. The calcine is fed only to the second reactor II of this stage, as well as the zinc sulfate bearing solution coming from the second leaching stage. To the second reactor of the first stage, there is also conducted the return acid solution coming from the first reactor and containing trivalent iron. In this stage (in the second reactor and onwards) the pH must be kept high owing to other impurities, at least on level 3, and in the last reactors above 4, and consequently the silicates are not dissolved.

Also in the second stage NL2 of neutral leaching, the pH also is kept fairly high, at least on level 2.5, but advantageously roughly on level 3.0, so that the oxides are dissolved, but the silicates are not, which renders an easily settled and filtered precipitate. It is not necessary to leach the ferrites in acid leaching, but the precipitate is conducted into a Waelz furnace, where the zinc ferrites and silicates are reduced by means of coal, and the zinc is evaporated. The zinc vapor is oxidized, and the formed oxide is conducted to the second stage of neutral leaching.

The zinc silicate coming along with the zinc oxide is not dissolved, but circulates back into the furnace, so that it does not constitute any drawback for the process. In the Waelz furnace the iron and silicate of the zinc concentrate form an iron silicate slag, which is an inert slag and thus harmless for the environment. If the amount of silicates obtained from the process is not sufficient for the formation of slag, silicate can be fed into the furnace for instance in the form of sand.

Although the zinc oxide obtained from the Waelz process is not pure, the process is advantageous, because there are now found the conditions where the zinc oxide coming from a furnace can be leached, but the silicate obtained along with the zinc oxide remains undissolved and returns to the furnace in the circulation.

Figure 3:
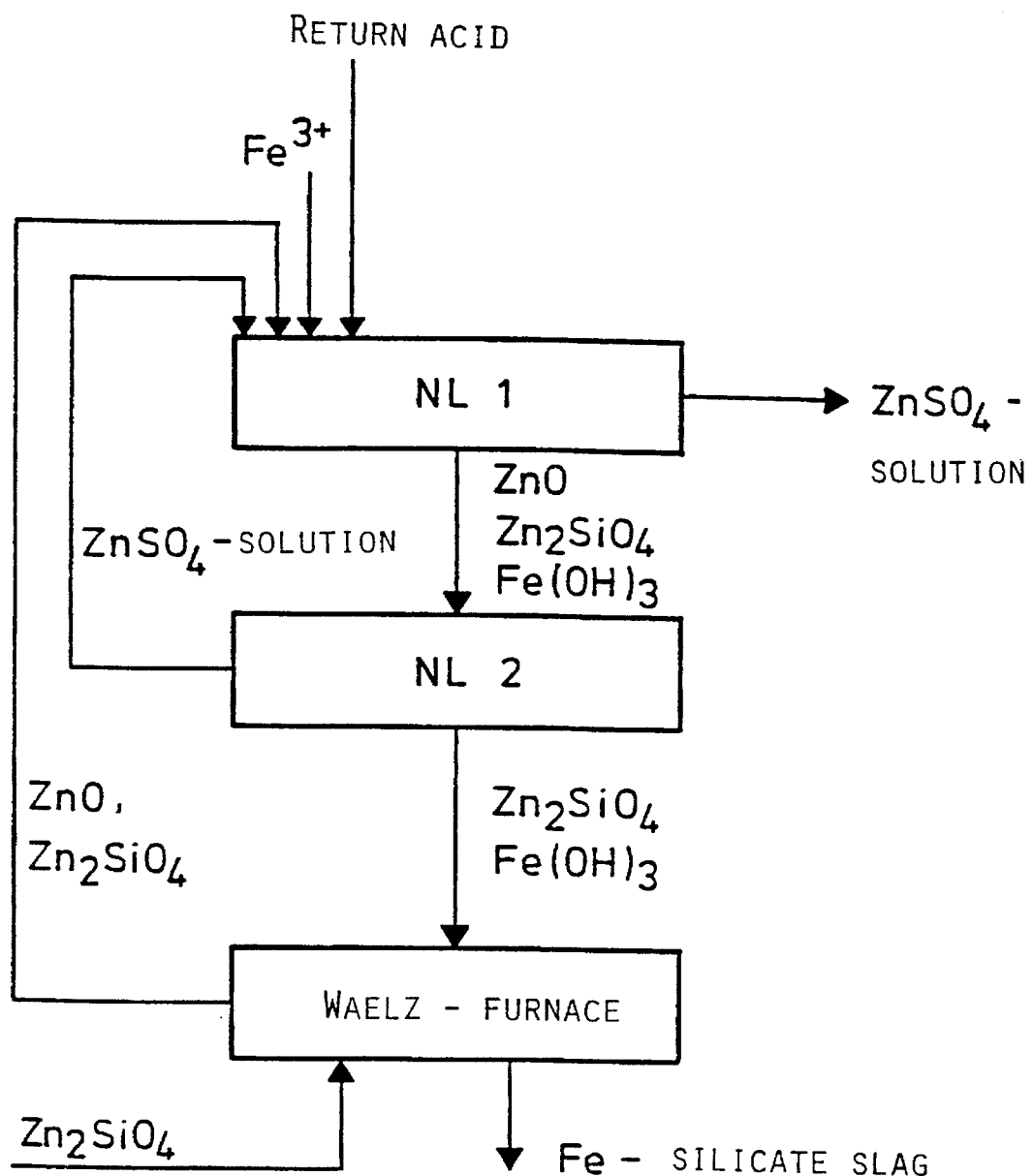
FIG. 3 is a flowsheet of another process according to the spirit of the present invention.

The flowsheet of FIG. 3 illustrates a process where the initial material is not zinc sulfide concentrate, which is roasted, but the initial material is mainly one containing zinc silicate. This material can be a concentrate or for instance a waste product formed in the production of lead. In this case the roasting of the initial material is not needed, but the process begins with feeding zinc silicate into the Waelz furnace. The zinc formed in the furnace, which zinc is oxidized into zinc oxide, and the zinc silicate obtained in the furnace as flue dust, are in this case fed to the first stage NL1 of neutral leaching. Because trivalent iron is important for the process as was described above, and because the amount of ferrites in the solution in this case is small, $Fe^{3+}$ is now added to the first stage of the leaching from its separate stage of preparation. Otherwise the process proceeds as was described above.

The invention is further described with reference to the following examples:

EXAMPLE 1

State of the art 150 g zinc oxide obtained from a Waelz furnace, its composition being Zn 58% and $SiO_2$ 6.5%, was leached into a solution with a $H_2SO_4$ content of 150 g/l and a Zn content of 50 g/l. The pH of the solution was 2, and the temperature 80° C. After leaching, the precipitate settled for an hour, so that the solid content of the slurry was 75 g/l, and the filtering test with settled slurry gave the result 23 kg/m²·h.

EXAMPLE 2

There were carried out three experiments according to the above example, but the pH of the solution was changed.

| Results | | | |
|---|---|---|---|
| pH | 4.5 | 3.5 | 3.0 |
| solid content g/l | 502 | 411 | 375 |
| filtering capacity/ kg/m² · h | 380 | 261 | 496 |

It is apparent from the results that there is a sharp difference between the pH levels 2 and 3. When the pH is 3, the process is technically feasible, but if the pH remains at only 2, there are great difficulties in the operation of the process.

I claim:

1. A method for leaching calcine material containing zinc oxide, zinc silicate and zinc ferrite comprising:

(a) neutral leaching the calcine material with sulfuric acid in at least two neutral leaching stages, the first of said neutral leaching stages being carried out in at least two reactors, including feeding all of the sulfuric acid for leaching to the first reactor of the first of said at least two neutral leaching stages and dissolving ferrite in said first stage to form trivalent iron in solution while maintaining a pH of at least 3 for dissolving the zinc oxide without dissolving the zinc silicate to produce a zinc sulfate solution and a leaching residue containing zinc silicate and zinc ferrite, recycling part of the leaching residue to said first reactor, all of said calcine material being fed only to the second reactor of said at least two reactors;

(b) subjecting the zinc sulfate solution to electrolysis;

(c) conducting the leaching residue produced in step (a) to a rotary furnace and heating the leaching residue with coal in the furnace and reducing and evaporating the zinc and forming an inert iron silicate slag in the furnace; and (d) oxidizing the evaporated zinc into zinc oxide and recycling the zinc oxide back to the neutral leaching.

2. The method of claim 1 and including obtaining zinc silicate as flue dust from the rotary furnace and feeding said zinc silicate and the zinc oxide from step (d) to the second of said neutral leaching stages.

3. The method of claim 1 and including obtaining zinc silicate as flue dust from the rotary furnace and feeding said zinc silicate to the first of said neutral leaching stages.

* * * * *

UNITED STATES PATENT AND TRADEMARK OFFICE
CERTIFICATE OF CORRECTION

PATENT NO.   : 5,585,079
DATED        : December 17, 1996
INVENTOR(S)  : Sigmund P. Fugleberg It is certified that error appears in the above-indentified patent and that said Letters Patent is hereby corrected as shown below:

On the title page, item [73]
Change the assignee "Outokumpu Engineering Contracters Oy"

to --Outokumpu Engineering Contractors Oy--.

Signed and Sealed this

Eighth Day of April, 1997

Attest:

BRUCE LEHMAN

Attesting Officer         Commissioner of Patents and Trademarks